(12) United States Patent
Zhang et al.

(10) Patent No.: US 12,083,643 B2
(45) Date of Patent: Sep. 10, 2024

(54) INTELLIGENT PRODUCTION LINE FOR MOTOR PULLEY

(71) Applicants: BENGBU HOWARD SPINNING TECHNOLOGY CO., LTD., Bengbu (CN); FUJIAN HOWARD SPINNING TECHNOLOGY CO., LTD, Longyan (CN)

(72) Inventors: Peikai Zhang, Longyan (CN); Ye Jiang, Longyan (CN); Bangliang Li, Guangan (CN); Huanle Lin, Longyan (CN); Lufen Zeng, Longyan (CN); Hepeng Sun, Anqing (CN); Jiangbin Su, Longyan (CN)

(73) Assignees: BENGBU HOWARD SPINNING TECHNOLOGY CO., LTD., Bengbu (CN); FUJIAN HOWARD SPINNING TECHNOLOGY CO., LTD., Longyan (CN)

( * ) Notice: Subject to any disclaimer, the term of this patent is extended or adjusted under 35 U.S.C. 154(b) by 0 days.

(21) Appl. No.: 17/872,015

(22) Filed: Jul. 25, 2022

(65) Prior Publication Data
US 2023/0035182 A1 Feb. 2, 2023

(30) Foreign Application Priority Data
Jul. 28, 2021 (CN) .......................... 202110855407.2

(51) Int. Cl.
*B23Q 17/24* (2006.01)
*B23Q 7/14* (2006.01)

(52) U.S. Cl.
CPC ....... *B23Q 17/2409* (2013.01); *B23Q 7/1447* (2013.01); *B23Q 7/1494* (2013.01); *B23Q 17/2471* (2013.01)

(58) Field of Classification Search
CPC .............. B23Q 17/2409; B23Q 7/1494; B23Q 17/2471; B23Q 7/249
See application file for complete search history.

(56) References Cited

FOREIGN PATENT DOCUMENTS

CN 214417027 U * 10/2021

OTHER PUBLICATIONS

Machine Translation of CN 214417027 U (Year: 2021).*

* cited by examiner

*Primary Examiner* — Christopher J. Besler

(57) ABSTRACT

An intelligent production line for motor pulley, include a processing mechanism; a feeding mechanism; a grasping mechanism; a detection mechanism, including a photographing device, a light source, a positioning block, and an image processing unit, the positioning block is used to place the pulley to be detected, the light source is used to illuminate the pulley to be detected, and the photographing device is arranged in the backlight direction of the light source, the image processing unit is used for acquiring the workpiece image of the pulley to be detected through the photographing device and detecting the workpiece parameters of the pulley to be detected through the workpiece image; a feedback mechanism, which communicates and connects the detection mechanism and the processing mechanism, and is used for acquiring the workpiece parameters and adjusting the processing parameters of the processing mechanism according to the parameters.

2 Claims, 10 Drawing Sheets

INTELLIGENT PRODUCTION LINE FOR MOTOR PULLEY

CROSS REFERENCE TO RELATED APPLICATIONS

This application claims all benefits accruing under 35 U.S.C. § 119 from China Patent Application No. 202110855407.2 filed on Jul. 28, 2021, in the State Intellectual Property Office of China, the disclosure of which is incorporated herein by reference in its entirety.

TECHNICAL FIELD

The disclosure generally relates to the field of pulley production, and more particularly to an intelligent production line for motor pulley.

BACKGROUND

The motor pulley drives the pulley through the belt to drive the generator rotor to rotate to generate electricity. For the manufacturing process of the pulley, certain parameters must be met, such as the angle of the groove and the total height.

In the process of manufacturing the workpiece, the workpiece needs to be picked up, fed, grasped, detected, etc. The traditional reclaiming system only has simple functions such as grasping and conveying, and cannot grasp, convey, and discharge the material. The realization of fully automatic conveying in the whole process, such as feeding, returning, etc., often requires manual intervention to realize the operation of the entire work. It is also necessary to manually transport the workpiece to each detection station, and to detect different parameters of the workpiece through each detection station, so as to meet the manufacturing requirements of the workpiece. At the same time, because the shape of the workpiece needs to be detected from multiple directions, the traditional workpiece detection requires manual processes such as transmission, detection, flipping, and re-detection, which requires a lot of manpower, resulting in low efficiency. The traditional on-line testing equipment cannot communicate with the detection station, and the testing results require the operator to modify the processing parameters of the equipment.

The purpose of this disclosure is to design an intelligent production line for motor pulley for the above existing technical problems.

SUMMARY OF DISCLOSURE

In view of the problems existing in the prior art, the disclosure provides an intelligent production line for motor pulley, and can effectively solve the problems existing in the prior art.

The technical scheme of the disclosure is:

An intelligent production line for motor pulley, comprising:
  a processing mechanism for processing the pulley to be tested;
  a feeding mechanism for conveying the pulley to be detected;
  a grasping mechanism for grasping the pulley to be detected;
  a detection mechanism, including a photographing device, a light source, a positioning block, and an image processing unit, the positioning block is used to place the pulley to be detected, the light source is used to illuminate the pulley to be detected, and the photographing device is arranged in the backlight direction of the light source, the image processing unit is used for acquiring the workpiece image of the pulley to be detected through the photographing device and detecting the workpiece parameters of the pulley to be detected through the workpiece image;
  a feedback mechanism, which communicates and connects the detection mechanism and the processing mechanism, and is used for acquiring the workpiece parameters and adjusting the processing parameters of the processing mechanism according to the parameters.

Further, the light source, the positioning block, and the photographing device are sequentially arranged on the same straight line.

Further, the image processing unit integrates: an extraction module, a fitting module, and a judgment module.

Further, the extraction module is used to extract the edge image in the workpiece image.

Further, the extraction module includes a binarization sub-module and an image difference sub-module, the binarization sub-module binarizes the workpiece image to obtain a binarized image, and the image difference sub-module makes a difference between the workpiece image and the binarized image to obtain the edge image.

Further, the fitting module respectively fits straight lines according to the two edges of the corresponding slot corners of the edge image, and calculates the intersection point of the two straight lines.

Further, the judgment module judges whether the intersection point is within the set range according to the coordinates of the intersection point, and if yes, judges that the pulley is qualified; otherwise, judges that the pulley is unqualified.

Further, the feeding mechanism includes a conveyor belt that circulates a tray, and the pulley to be processed is placed on the tray.

Further, the grasping mechanism includes a three-axis slide rail erected between the processing mechanism, the feeding mechanism and the detection mechanism.

The technical scheme has the following technical effects:

In the present invention, the light source is used to illuminate the pulley to be detected, the photographing device is arranged in the backlight direction of the light source, and the image processing unit is used to obtain the workpiece image of the pulley to be detected through the photographing device and pass the workpiece image detects the workpiece parameters of the pulley to be detected, and feeds it back to the processing mechanism through the feedback mechanism, so that the working parameters of the processing mechanism can be quickly adjusted, so as to realize real-time adjustment of the processing steps of the processing mechanism and prevent problems in mass-processing workpieces.

Through the extraction module, the fitting module and the judging module, the present extracts the edge of the workpiece image and fits an straight line respectively, and then judges whether the pulley is qualified by the position of the intersection of the straight lines, and can automatically detect the groove angle of the workpiece through the position of the intersection. Whether the parameters such as angle, length, and direction are qualified, the whole detection process is fast and convenient. It only needs to place the workpiece and take a image of the workpiece to quickly calculate whether the workpiece is qualified or not. There is no need to measure with a ruler and other tools, so that new errors will not be introduced, the whole judgment process is less than 1 second.

The present invention obtains the edge image of the groove angle through binarization, differential image calculation, or obtaining wave peaks/valleys through grayscale histogram, thereby providing a good image basis for subsequent steps.

The present invention obtains the parameters of the groove angle by fitting a straight line, so that no manual measurement is required, and no measurement is required by a machine operating a ruler/angle ruler, etc., and the work efficiency is greatly improved.

The present invention obtains the black and white image of the workpiece under backlight conditions, so that a better image can be obtained, the workpiece and the background can be better separated, and the accuracy in the subsequent steps can be improved.

It is to be understood that both the foregoing general description and the following detailed description of the present invention are exemplary and explanatory and are intended to provide further explanation of the invention as claimed.

DETAILED DESCRIPTION

To facilitate the understanding of those skilled in the art, the structure of the disclosure is further described in detail in connection with the accompanying drawings:

Embodiment 1

Figure 1:
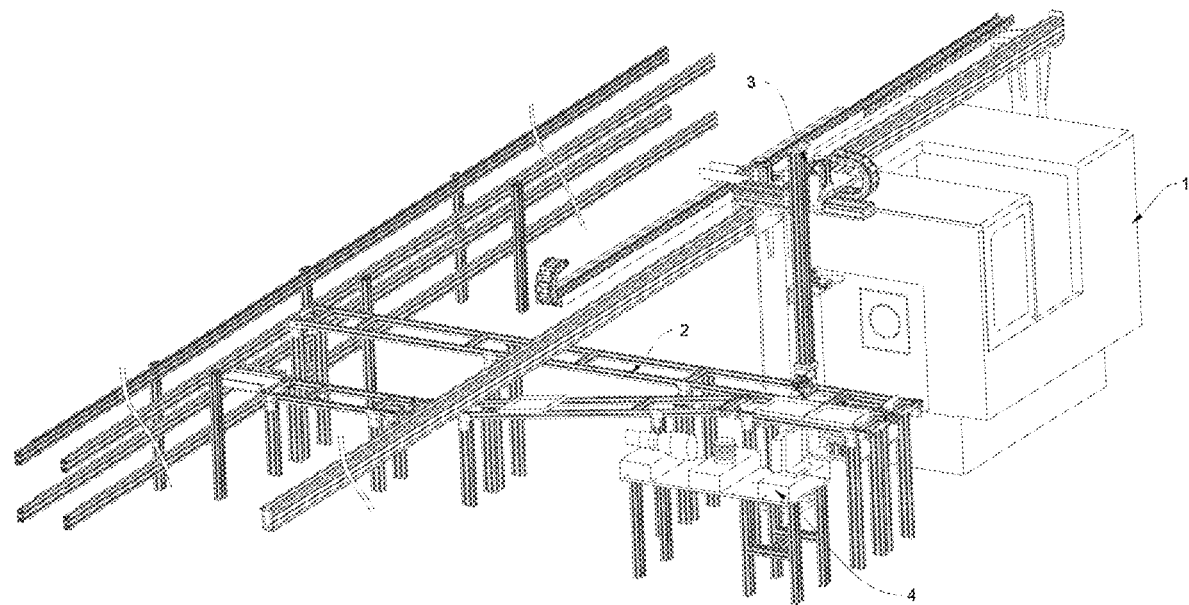
FIG. 1 is a schematic structural diagram of the present invention.
Figure 2:
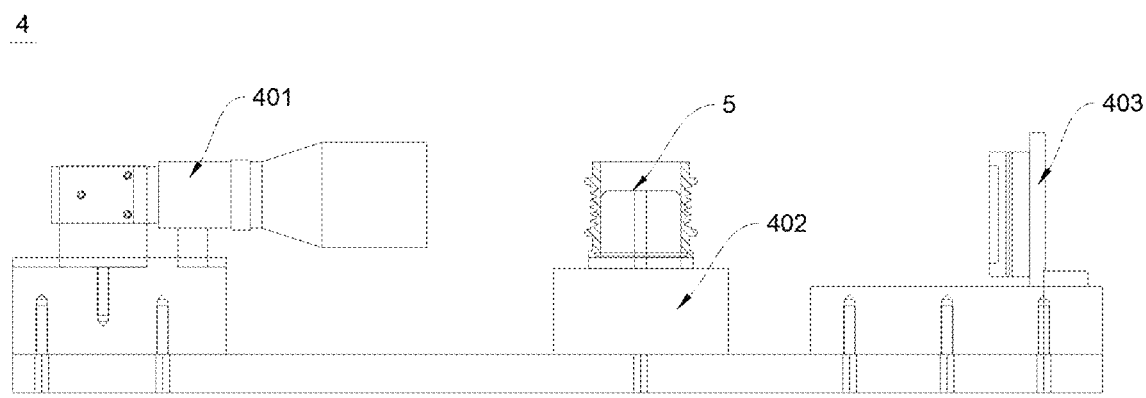
FIG. 2 is a schematic structural diagram of the detection mechanism.

One embodiment of the disclosure, referring to FIG. 1-2.

An intelligent production line for motor pulley, comprising:

A processing mechanism 1 for processing the pulley to be tested.

A feeding mechanism 2 for conveying the pulley to be detected; the feeding mechanism 2 includes a conveyor belt that circulates a tray, and the pulley to be processed is placed on the tray.

A grasping mechanism 3 for grasping the pulley to be detected; the grasping mechanism 3 includes a three-axis slide rail erected between the processing mechanism, the feeding mechanism and the detection mechanism.

In this embodiment, the processing mechanism 1, the feeding mechanism 2, and the grasping mechanism 3 are all directly adopted in the prior art, and belong to the direct outsourcing of the prior art. In addition, it does not belong to the core improvement point of this embodiment and will not be described in detail. For its specific structure and principle, please refer to the application number 202023161439.2, which is named as the description of a mechanical processing automation system for intelligent online detection.

A detection mechanism 4, including a photographing device 401, a light source 403, a positioning block 402, and an image processing unit (not shown), the positioning block 402 is used to place the pulley 5 to be detected, the light source 403 is used to illuminate the pulley 5 to be detected, and the photographing device 401 is arranged in the backlight direction of the light source, the image processing unit is used for acquiring the workpiece image of the pulley 5 to be detected through the photographing device 401 and detecting the workpiece parameters of the pulley 5 to be detected through the workpiece image.

In this embodiment, the acquired image of the workpiece is in black and white. In other embodiments, the image of the workpiece may also be in color, and only needs to be decolorized into black and white, which is not limited here. In this embodiment, the workpiece image is acquired under backlight conditions, specifically, the workpiece is placed on the upper surface of the positioning block 402, the light source 403 illuminates from one side of the workpiece, the camera shoots the workpiece from the other side of the workpiece, the light source 403, the positioning block 402, the photographing devices 401 are sequentially arranged on the same straight line.

Figure 3:
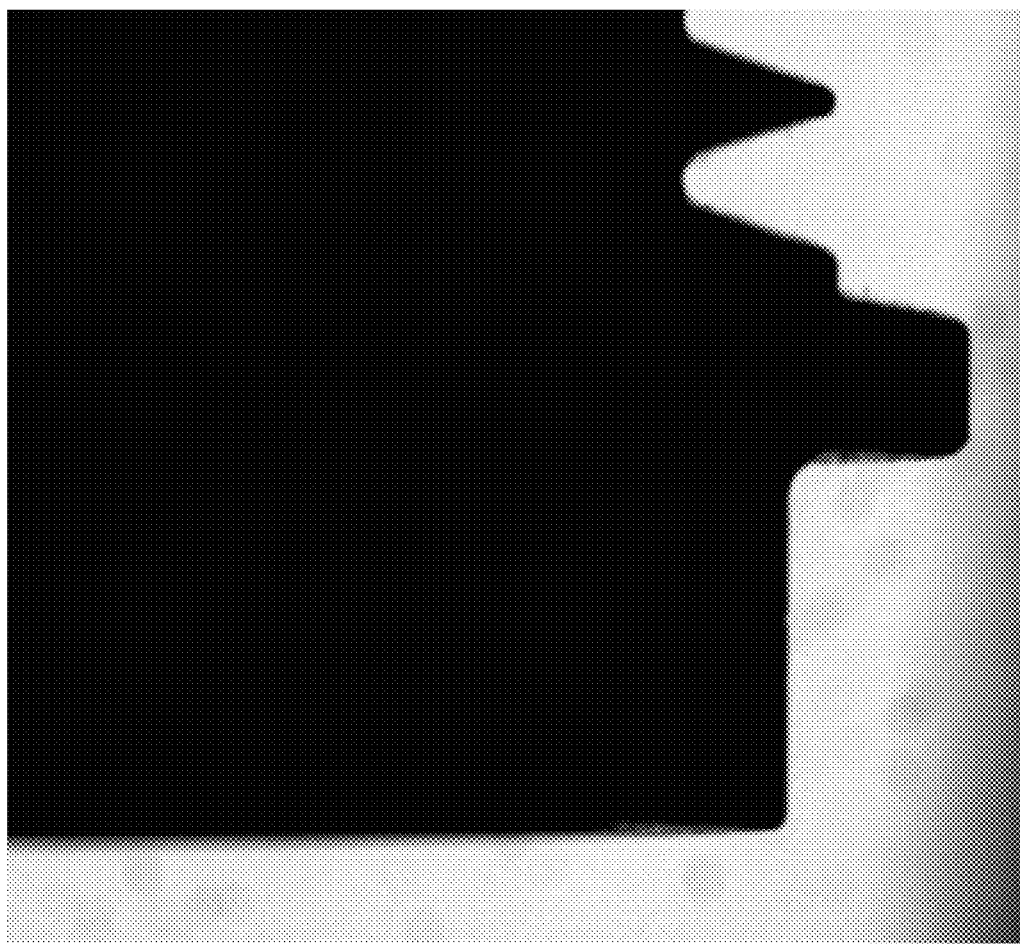
FIG. 3 is a workpiece image acquired by the photographing device.

Since the workpiece is between the light source 403 and the camera, the background brightness is much higher than that of the workpiece, the edges of the workpiece image are clear, and the edge and background can be separated better. In this step, the result is shown in FIG. 3, for convenience of presentation, FIG. 3 only shows part of the workpiece image. FIG. 3 includes some groove angles, and a contact surface of the workpiece with the positioning block 402 (bottom in FIG. 3).

Specifically, the image processing unit integrates: an extraction module, a fitting module, and a judgment module. The extraction module is used to extract the edge image in the workpiece image. The extraction module includes a binarization sub-module and an image difference sub-module, the binarization sub-module binarizes the workpiece image to obtain a binarized image, and the image difference sub-module makes a difference between the workpiece image and the binarized image to obtain the edge image.

Figure 4:
FIG. 4 is a binarized image obtained by the extraction module according to FIG. 3.
Figure 5:
FIG. 5 is a difference image obtained by the extraction module according to FIG. 4.

The working principle of the extraction module is as follows: obtain a binarized image by binarizing the workpiece image, and obtain an edge image in the workpiece image by making a difference between the workpiece image and the binarized image. The binarized image is shown in FIG. 4. Next, an edge image in the workpiece image is obtained by making a difference between the workpiece image and the binarized image, and a difference image is shown in FIG. 5.

Figure 6:
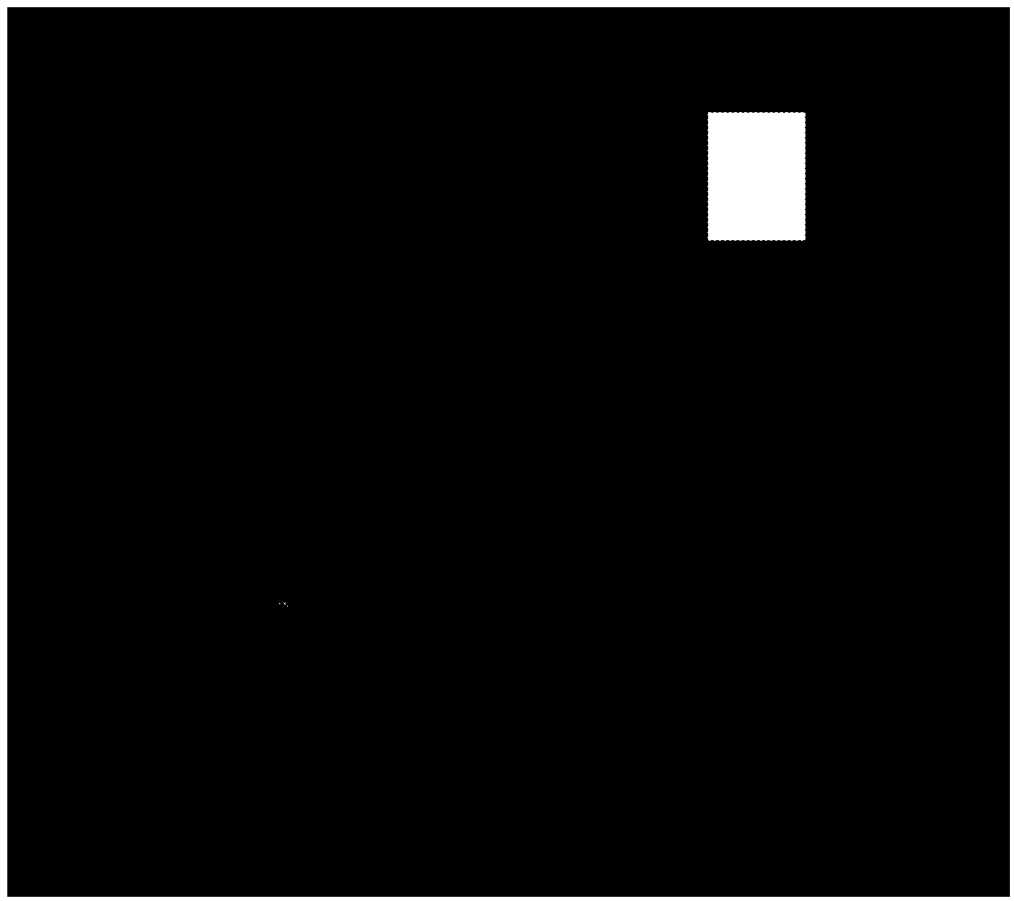
FIG. 6 is a schematic diagram of an image mask of the shielding module.
Figure 7:
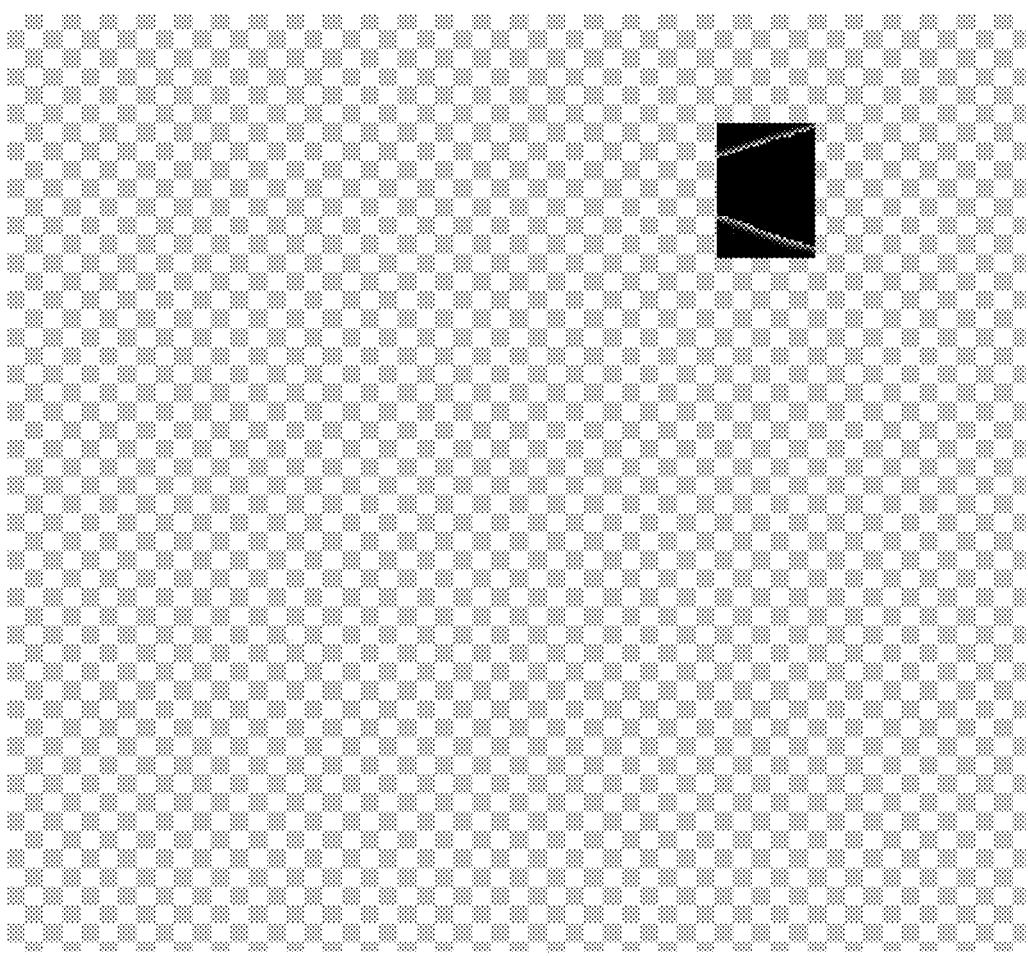
FIG. 7 is an image exposed by the shielding module in FIG. 5 after being shielded by FIG. 6.

Specifically, in this embodiment, the image processing unit is further integrated with a shielding module, and the shielding module uses an image mask as shown in FIG. 6 to shield or expose. The key point of the image mask is to block the part of the edge image that has nothing to do with the groove angle parameters (such as the image other than the workpiece groove angle), and to block the non-linear part of the groove angle in the edge image (such as the are part at the bottom of the groove angle), only the straight line-like parts of the groove corners in the edge image are exposed, resulting in the image shown in FIG. 7.

Next, the fitting module respectively fits straight lines according to the two edges of the edge image corresponding to the slot corners, and calculates the intersection point of the two straight lines.

Figure 8:
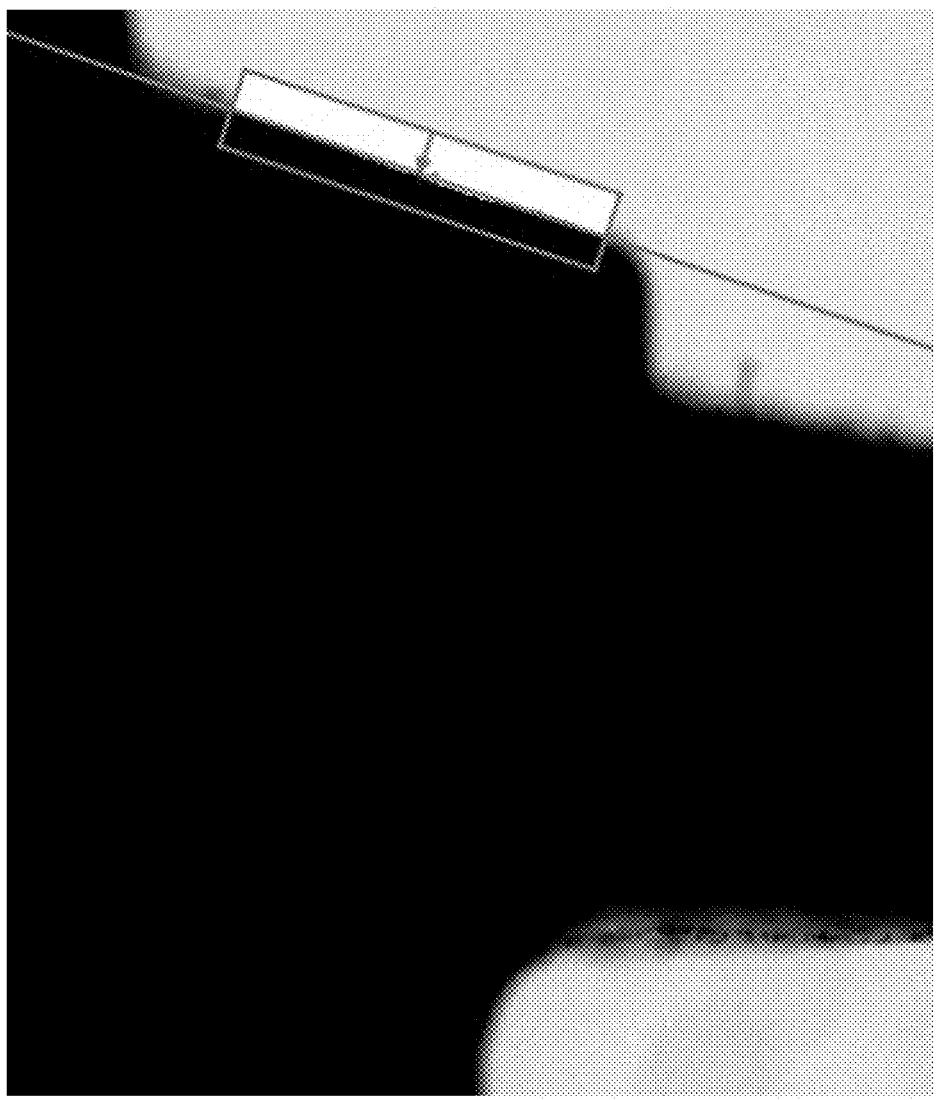
FIG. 8 is a schematic diagram of one of the straight lines obtained by the fitting module according to FIG. 7.

The fitting module obtains the coordinates of each pixel point on one side of the slot corner edge image according to the two edges of the slot corner edge image corresponding to the slot corner edge image, calculate the intersection point of the two straight lines. Through the image shown in FIG. 8, only the pixel points of one of the slot corner edges are retained, the coordinates of each pixel point on one side of the slot corner edge image are obtained, and one of the straight lines is fitted as shown in FIG. 8, and repeat the step to get another straight line. Specifically, the algorithm of straight-line fitting assumes that the deviation of the X and Y coordinates of each point fits a normal distribution with mean 0, and fit discrete points to a line as ax+by+c=0, a is a slope and b is an intercept. The least squares method is to fit N points so that the overall deviation from the fitted straight line is as small as possible. The solution method is also very simple, which is to minimize the vertical deviation of each point to the straight line. The difference from the univariate linear regression algorithm: the univariate linear regression algorithm assumes that x is deviation-free and only y has deviation. The obtaining step, the extraction step, and the shielding step provide a good image basis for this step, which can effectively improve the accuracy of the straight-line fitting and prevent deviations in the straight-line fitting. In this embodiment, a least squares straight line fitting algorithm is used to perform straight line fitting, and the least squares method is a mathematical optimization technique. It finds a best functional match for the data by minimizing the sum of squared deviation. The unknown data can be easily obtained by the least squares method, and the sum of squares of the errors between the obtained data and the actual data can be minimized. The least squares method can also be used for curve fitting. Some other optimization problems can also be formulated with least squares by minimizing energy or maximizing entropy. The least squares method adopted in this embodiment is the prior art, and the details are not introduced here.

Finally, the judgment module judges whether the intersection point is within the set range according to the coordinates of the intersection point, and if yes, judges that the pulley is qualified; otherwise, judges that the pulley is unqualified.

Figure 9:
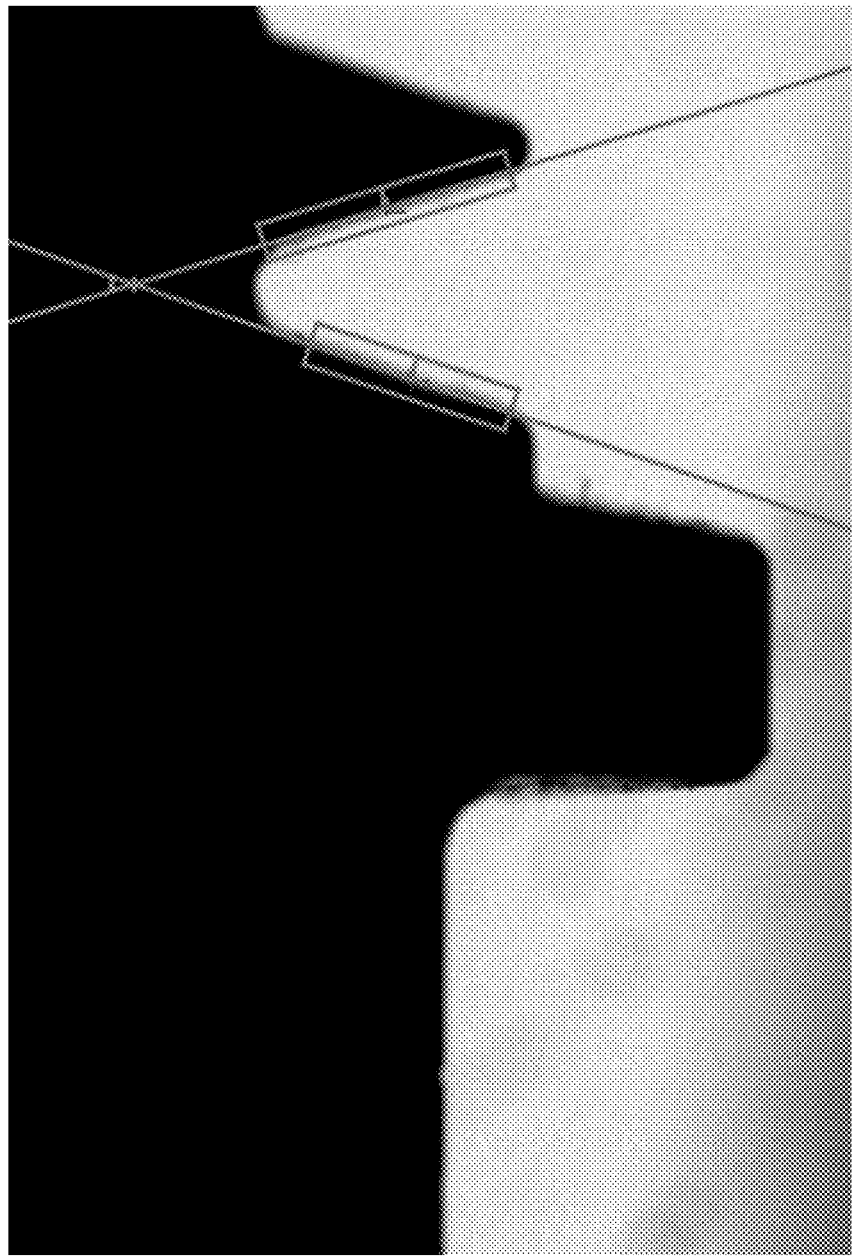
FIG. 9 is a schematic diagram of fitting two straight lines to the edge of the slot corner.

It is judged whether the intersection point is within the set range, and if so, it is judged that the pulley is qualified; otherwise, it is judged that the pulley is unqualified. The judging whether the intersection point is within the set range is specifically: setting a reference line, the reference line being parallel to the upper surface of the positioning block, calculating the distance between the intersection point and the reference line, and judging the distance within the set range. In this embodiment, after the two straight lines shown in FIG. 9 are obtained through the fitting step, the general equation of the straight line is: $f(x)=ax+by+c=0$. Now that we assume two points of the line, for example (x0, y0) and (x1, y1), we can get: $a=y0-y1$, $b=x1-x0$, $c=x0y1-x1y0$.

So, we can express the two straight lines as: $f0(x)=a0*x+b0*y+c0=0$, $f1(x)=a1*x+b1*y+c1=0$.

Then the intersection of the two lines should satisfy: $a0*x+b0*y+c0=a1*x+b1*y+c0$.

It can be deduced from the above:

$x=(b0*c1-b1*c0)/D;$ $y=(a1*c0-a0*c1)/D;$ $D=a0*b1-a1*b0$, (When D is 0, it means that the two lines are coincident)

Thus, the intersection of the two straight lines is calculated, as shown in FIG. 9.

Figure 10:
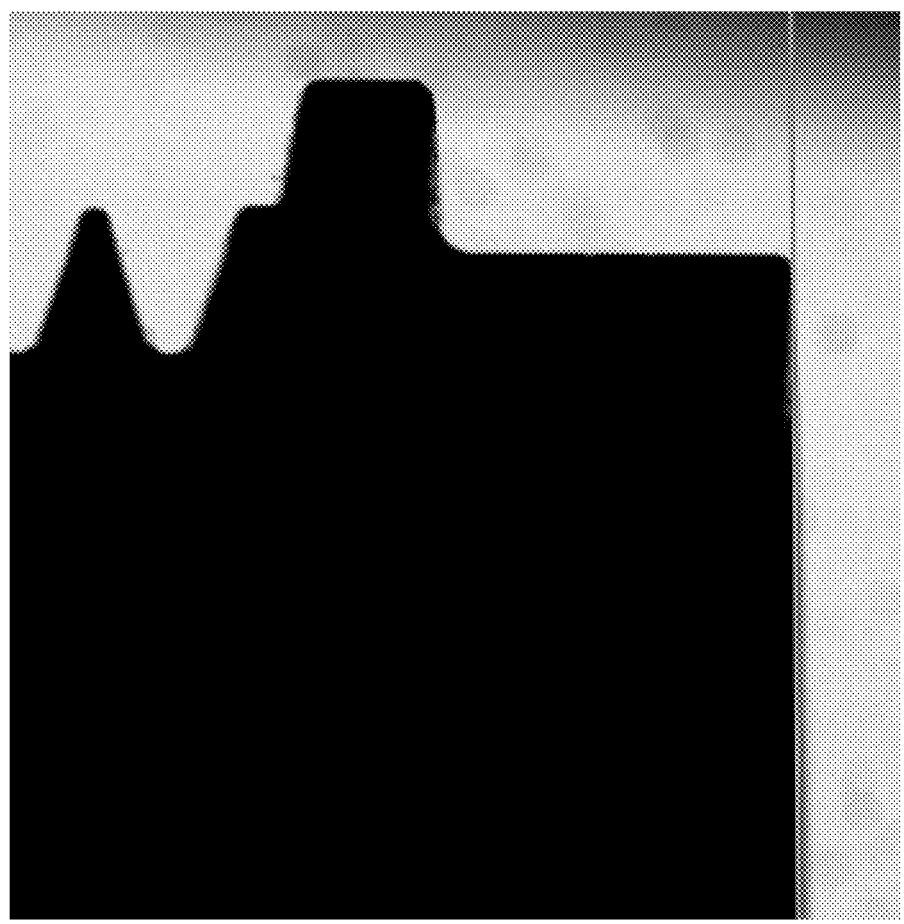
FIG. 10 is a schematic diagram of a reference line.
Figure 11:
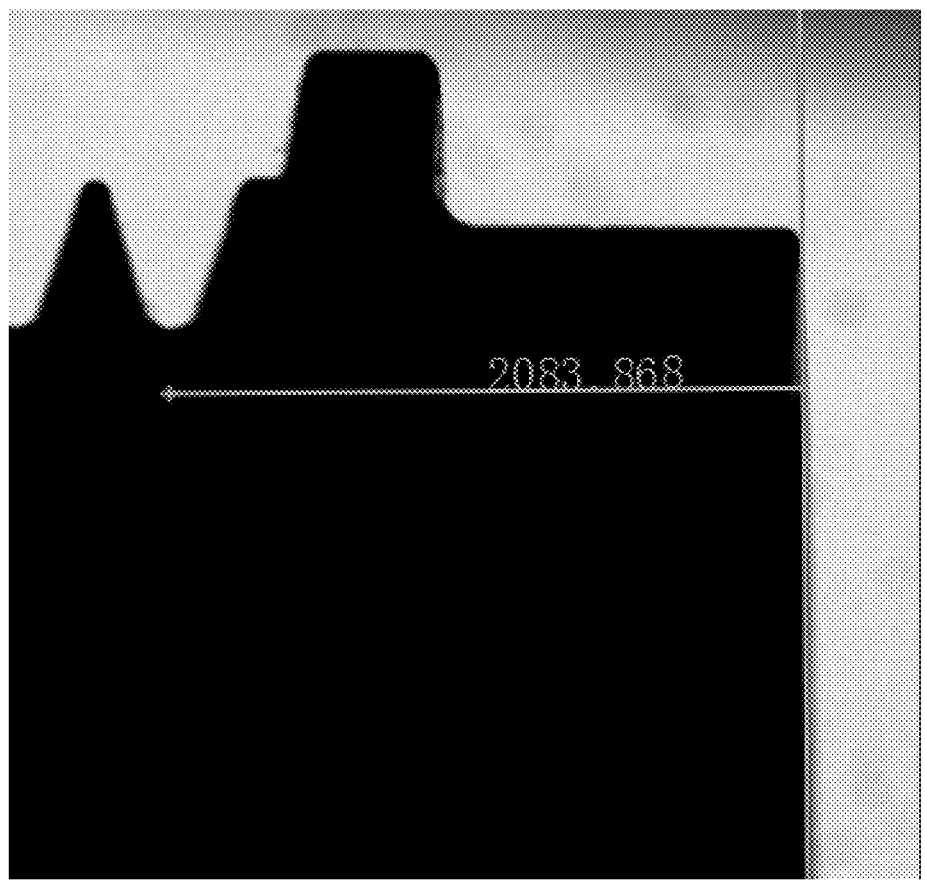
FIG. 11 is a schematic diagram of the distance between the intersection point and the reference line.

In order to judge whether the parameters of the slot angle meet the requirements, it is necessary to judge whether the intersection point is within the set range. Specifically, a reference line is preset, and the reference line can be set before all steps, and the reference line is made for a specific position that needs to be marked. The position of the reference line in the overall image field of view is will not change. The reference straight line can be determined according to two manual points, or other tools refer to the applied point. In this embodiment, a straight line parallel to the upper surface of the positioning block is set as the reference straight line, as shown in FIG. 10. In other embodiments, the reference line can satisfy the fixed position and can be used to measure the distance from the above-mentioned intersection point. Then, calculate the distance between the intersection point and the reference line, as shown in FIG. 11, through this distance, we can know whether the groove angle is qualified. Because there is an error in the groove angle of the pulley, for example, the groove angle deviates from the original position, the angle of the groove angle is not within the set range, the length error of the groove angle, etc., will affect the two groove corner edges of the groove angle. Thereby, the position of the intersection of the two groove corner edges of the groove corner is affected. Through the distance, parameters such as the position of the slot angle, the angle of the slot angle, and the length of the slot angle can be easily determined. If the distance is within the preset threshold, it can be determined that the parameters of the slot angle are qualified. A distance calculated in this embodiment is 2083.868, a preset threshold range is 2080-2085, so it is judged as qualified.

A feedback mechanism, which communicates and connects the detection mechanism and the processing mechanism, and is used for acquiring the workpiece parameters and adjusting the processing parameters of the processing mechanism according to the parameters.

The foregoing description is only a preferred embodiment of the disclosure, and all changes and modifications to the patent scope applied for in accordance with the disclosure shall belong to the scope covered by the disclosure.

What is claimed is:

1. An intelligent production line for motor pulley, comprising:
   a detection mechanism, including a camera, a light source, a positioning block, and an image processing unit, the positioning block is configured to support a motor pulley, the light source is configured to illuminate the motor pulley, and the camera is arranged in a backlight direction of the light source and is configured to take an image of the motor pulley, the image processing unit is configured to detect parameters of the motor pulley through the image of the motor pulley, wherein the image processing unit comprises an extraction module, a fitting module, and a judgment module; the extraction module is configured to extract an edge image of the motor pulley from the image of the motor pulley; the fitting module is configured to respectively fit straight lines according to two edges of corresponding slot corners of the edge image, and calculate an intersection point of the two straight lines; the judgment module is configured to judge whether the intersection point is within a set range according to coordinates of the intersection point, and if yes, judge that the motor pulley is qualified; otherwise, judge that the motor pulley is unqualified.

2. The intelligent production line for motor pulley according to claim 1, wherein the light source, the positioning block, and the photographing device are sequentially arranged on the same straight line.

* * * * *